Figure 1:
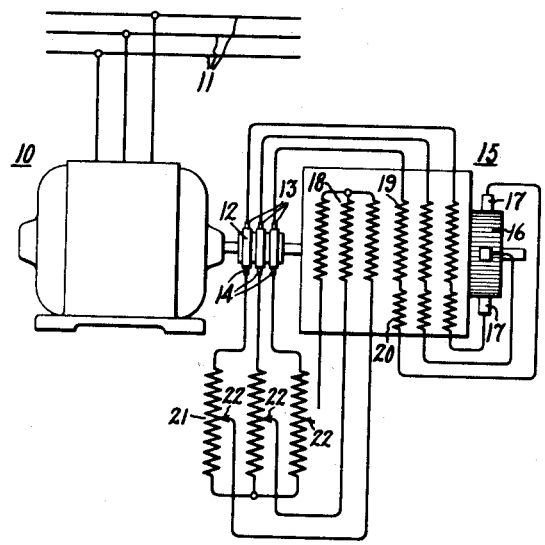

June 26, 1934.  W. WEILER  1,964,548

CASCADE OF ASYNCHRONOUS DYNAMO ELECTRIC MACHINES

Filed May 18, 1933

Inventor:
Wilhelm Weiler,
by Charles E. Tullar
His Attorney.

Patented June 26, 1934

1,964,548

UNITED STATES PATENT OFFICE 1,964,548

CASCADE OF ASYNCHRONOUS DYNAMO-ELECTRIC MACHINES

Wilhelm Weiler, Berlin-Niederschonhausen, Germany, assignor to General Electric Company, a corporation of New York Application May 18, 1933, Serial No. 671,724
In Germany June 17, 1932

8 Claims. (Cl. 172—274)

My invention relates to an arrangement wherein a commutator type regulating machine is concatenated with the secondary winding of an asynchronous dynamo electric machine. The principal object of my invention is to improve the commutation of the regulating machine in the above mentioned arrangement.

To facilitate the remaining description, I will describe my invention in connection with a well known arrangement consisting of a wound secondary induction motor whose speed, power factor, or both, are controlled by a commutator type regulating machine concatenated with the motor secondary winding. However, I wish it clearly understood that this is given merely for illustrative purposes and that my invention is not limited to this use.

The commutator type regulating machine concatenated with the induction motor secondary winding is usually provided with commutating windings for the purpose of improving the commutation. Even then it is often times difficult to obtain good commutation, because not only are there present all the difficulties of obtaining good commutation that exist in direct current commutator type machines, but there is also present an additional difficulty due to the fact that alternating current of slip frequency flows through the regulating machine whenever the induction motor is running above or below its synchronous speed. This difficulty of obtaining good commutation is especially great with a large capacity regulating machine, such as is required when the speed of a large capacity induction motor operating at nearly full load is varied over a large range.

I have discovered that one of the main causes of the difficulty of obtaining good commutation on the regulating machine is due to the fact that in practically all cases a non-sinusoidal alternating voltage is induced in the secondary winding of the induction motor concatenated with the regulating machine when the motor is running above or below its synchronous speed. Furthermore, I have discovered that when this induced alternating voltage is sinusoidal in shape, or substantially so, commutation of the regulating machine is greatly improved, and it is considerably easier to get good commutation, even on a large capacity regulating machine. The essence of my invention may therefore be said to consist of concatenating the regulating machine with the secondary winding of an induction motor, or an asynchronous dynamo electric machine in the broad aspect of the invention, the motor or dynamo electric machine being so constructed that a substantially sinusoidal alternating voltage is induced in its secondary winding when it runs above or below its synchronous speed. The induction motor or asynchronous dynamo electric machine may be constructed in any suitable manner to obtain this substantially sinusoidal induced alternating voltage. Without intending to limit my invention in any degree, I will describe one construction of an induction motor for obtaining this substantially sinusoidal induced alternating voltage. Briefly described, this consists of so skewing the stator slots, or the rotor slots, or both, of the induction motor that a substantially sinusoidal alternating voltage is induced in its secondary winding.

Having outlined the basic principle of my invention, I will now describe it in greater detail in connection with the accompanying drawing, while those features of my invention which are believed to be novel and patentable are pointed out in the appended claims.

Figure 2:
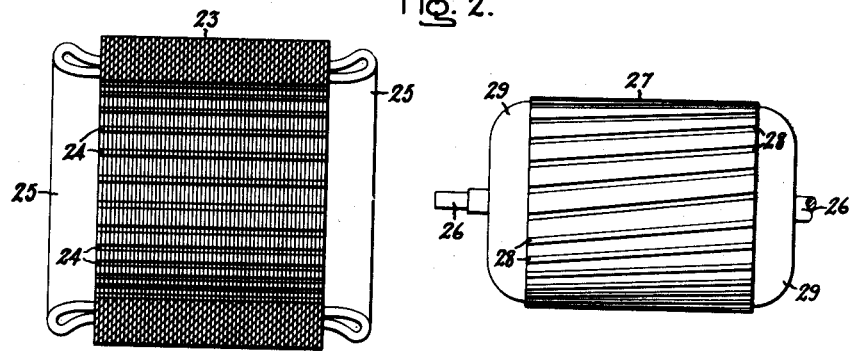

Fig. 1 of the drawing diagrammatically represents an induction motor concatenated with a commutator type regulating machine, and Fig. 2 represents portions of the stator and rotor members of the induction motor showing a preferred form of construction thereof for obtaining a substantially sinusoidal induced alternating voltage in the motor secondary winding.

In Fig. 1, a three-phase induction motor is represented generally by 10. This motor has a stationary primary winding connected to a three-phase alternating current source 11, and has a rotatable secondary winding connected to collector rings 12 on which rest two sets of brushes 13 and 14, respectively. A regulating machine is represented generally by 15, and comprises a rotatable armature winding connected to a commutator 16 on which rests three substantially equally spaced apart brushes 17, a stationary exciting winding 18, a stationary compensating winding 19, and a stationary commutating winding 20. In this embodiment of my invention I prefer to show the armature of regulating machine 15 mechanically coupled to the rotor of motor 10 so that the latter will operate at constant horse power output. However, I wish it clearly understood that this is done merely for illustrative purposes, and that my invention is equally applicable to any of the other well known arrangements where a commutator regulating machine is concatenated with the secondary winding of an induction motor. Compensating winding 19 and commutating winding 20 of the regulating machine are connected in series between its commutator brushes 17 and brushes 13 of the induction motor. An auto-transformer 21 is connected to brushes 14 of the induction motor, this auto-transformer having adjustable taps 22 to which are connected the free ends of exciting winding 18 of the regulating machine. As is well known to those skilled in the art to which this invention relates, the speed of induction motor 10 may be varied by changing the positions of taps 22 on auto-transformer 21.

There may be several reasons which make it extremely difficult to obtain good commutation on a commutator type regulating machine when it is concatenated with a wound secondary induction motor, each of these reasons being due to a non-sinusoidal alternating voltage induced in the motor secondary winding. In order to facilitate the explanation of what I believe to be the reasons, I will assume that a non-sinusoidal alternating voltage is induced in the secondary winding of motor 10 when it is running above or below its synchronous speed, and I will describe the relationship between the voltages, currents, etc., in the motor secondary winding and the regulating machine. Let $E_s$ and $E_r$ represent the alternating voltages induced in the secondary winding of motor 10 and the armature winding of regulating machine 15, respectively. The vector sum of $E_s$ and $E_r$ is the effective voltage in the concatenated circuit comprising the motor secondary winding, the compensating winding 19, the commutating winding 20, and the commutated armature winding. This effective voltage is consumed in overcoming IR and IX drops in the above described circuit. $E_r$ is mostly always approximately sinusoidal in shape, and since I have assumed that $E_s$ is non-sinusoidal in shape it follows that the vector sum of these voltages, namely the effective voltage, is also non-sinusoidal in shape. The more $E_s$ deviates from a sinusoidal shape and the greater it is in relation to the effective voltage, the more will the effective voltage deviate from a sinusoidal shape. When a large induction motor operating at, or nearly at, its full load is caused to run at considerably above or below its synchronous speed by means of a commutator regulating machine concatenated therewith, the ratio of $E_s$ to the effective voltage in the concatenated circuit may even exceed the ratio of 10 to 1. It follows that in such cases the effective voltage will deviate considerably from a sinusoidal shape.

The upper harmonics of the non-sinusoidal effective voltage are mainly used up in overcoming the IX drops in the various parts of the concatenated circuit. The IX drop in the secondary winding of motor 10 is of no interest in this description and will, therefore, not be explained. That portion of the total IX drop which takes place in regulating machine 15 is due partly to leakage fluxes of its compensating winding 19 and its armature winding, and partly due to a non-sinusoidal flux passing through its commutating winding 20, this flux being non-sinusoidal for reasons stated below. This flux, however, also passes through those armature coils which are short-circuited by the commutator brushes during the commutation process and induces voltages in these coils which cause sparking.

I also believe that the non-sinusoidal effective voltage in the concatenated circuit will nearly always cause the currents flowing in this circuit to be non-sinusoidal in shape, hence non-sinusoidal currents will flow in the commutated armature winding of regulating machine 15. This will cause the self-induced voltage in each armature coil short-circuited by a commutator brush during the commutation process to be higher than would be the case if these currents were sinusoidal in shape, thus greatly increasing the difficulty of obtaining good commutation. I also believe that the non-sinusoidal voltage between collector rings 12 will nearly always cause non-sinusoidal currents to flow in exciting winding 18 of regulating machine 15. This will induce in each armature coil short-circuited by a commutator brush during the commutation process a higher voltage than would be the case if these currents were sinusoidal in shape, thus greatly increasing the difficulty of obtaining good commutation.

It should now be obvious that if motor 10 is so constructed that a substantially sinusoidal alternating voltage is induced in its secondary winding when it runs above or below its synchronous speed, the above described difficulties to obtaining good commutation on machine 15, as well as other possible difficulties not mentioned, will either be entirely eliminated or very greatly reduced and it will therefore be much easier to obtain good commutation on machine 15, even if the latter is a large capacity machine. Furthermore, it should be obvious that improved commutation should result even if machine 15 has no commutating windings.

In Fig. 2, I show a preferred manner of constructing the stator and rotor elements of motor 10 so that a substantially sinusoidal alternating voltage will be induced in its secondary winding. In Fig. 2, a section of the laminated stator frame of motor 10 is represented by 23. This frame has on its inner periphery a plurality of parallel non-skewed slots 24 in which is located the motor primary winding represented by 25. It can be seen that slots 24 are non-skewed because they are parallel to and lie in the same direction as the shaft 26 of the rotor element 27 of the motor shown on the right-hand side of Fig. 2. Rotor element 27 has a laminated core which has on its outer periphery a plurality of parallel skewed slots 28 in which is located the motor secondary winding represented by 29. It can be seen that slots 28 are skewed because they do not lie in the same direction as shaft 26. I have shown each slot 28 skewed by an amount substantially equal to the distance between the centers of two adjacent slots, i. e., by an amount substantially equal to the slot pitch. I believe that when slots 24 and 28 are constructed as shown, a substantially sinusoidal alternating voltage will be induced in secondary winding 29. However, it may be desirable or necessary to construct these slots otherwise than as shown in order to obtain the desired result. Thus, for example, slots 24 may be constructed as shown, and each slot 28 may be skewed more or less than the slot pitch, or each slot 28 may be skewed an amount equal to the product of an integral number thereof times the slot pitch, or by an amount more or less than some such product. On the other hand, slots 28 may be made non-skewed as shown with slots 24 and the latter may be made so that each slot is skewed an amount equal to, more, or less than, the slot pitch; or each slot may be skewed an amount equal to the product of an integral number thereof times the slot pitch; or by an amount more or less than some such product. Finally, slots 24 and 28 may both be skewed in any of a great variety of ways to produce the equivalent effect of any of the above mentioned possible ways of skewing only one set of slots. In short, either or both sets of slots may be skewed in any desirable manner to obtain the desired result. Since the most appropriate manner of skewing either or both sets of slots to obtain the desired result may vary with each case, I have illustrated only what I believe is the preferred manner.

In accordance with the provisions of the patent statutes, I have described the principles of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. In combination, an asynchronous dynamo electric machine having relatively rotatable primary and secondary windings, said machine being so constructed that a substantially sinusoidal alternating voltage is induced in its secondary winding when it is operating away from its synchronous speed, and a regulating machine having a commutated armature winding electrically associated with said secondary winding.

2. In combination, an asynchronous dynamo electric machine having slotted stator and rotor members, a primary winding in the slots of one of said members, a secondary winding in the slots of the other of said members, said slots being so arranged that a substantially sinusoidal alternating voltage is induced in said secondary winding when said machine is operating away from its synchronous speed, a regulating machine having a commutated armature winding, and means for connecting said commutated armature winding in series with said secondary winding.

3. In combination, an asynchronous dynamo electric machine having slotted stator and rotor members, a primary winding in the slots of one of said members, a secondary winding in the slots of the other of said members, said slots being so skewed relatively to each other that a substantially sinusoidal alternating voltage is induced in said secondary winding when said machine is operating away from its synchronous speed, a regulating machine having a commutated armature winding and a commutating winding, and means for connecting said regulating machine in series with said secondary winding.

4. In combination, an asynchronous dynamo electric machine having slotted stator and rotor members, a primary winding in the slots of one of said members, a secondary winding in the slots of the other of said members, the slots of one of said members being so skewed that a substantially sinusoidal alternating voltage is induced in said secondary winding when said machine is operating away from its synchronous speed, a regulating machine having a commutated armature winding, and means for connecting said regulating machine in series with said secondary winding.

5. In combination, an asynchronous dynamo electric machine having slotted stator and rotor members, a primary winding in the slots of one of said members, a secondary winding in the slots of the other of said members, the slots of said members being skewed relatively to each other by an amount substantially equal to the product of an integral number of slots of one of said members by its slot pitch, a regulating machine having a commutated armature winding and a commutating winding, and means for connecting said regulating machine in series with said secondary winding.

6. In combination, an asynchronous dynamo electric machine having stator and rotor members, a primary winding on one of said members, the other of said members having peripheral slots and a secondary winding in these slots, said slots being so skewed that a substantially sinusoidal alternating voltage is induced in said secondary winding when said machine is operating away from its synchronous speed, a regulating machine having a commutated armature winding and a commutating winding, and means for connecting said regulating machine in series with said secondary winding.

7. In combination, an asynchronous dynamo electric machine having stator and rotor members, a primary winding on one of said members, the other of said members having peripheral slots and a secondary winding in these slots, said slots being skewed by an amount substantially equal to the product of an integral number thereof by the slot pitch, a regulating machine having a commutated armature winding and a commutating winding, and means for connecting said regulating machine in series with said secondary winding.

8. In combination, an asynchronous dynamo electric machine having a stationary primary winding, a rotor member having peripheral slots with a secondary winding in these slots, said slots being skewed an amount substantially equal to the slot pitch, a regulating machine having a commutated armature winding and a commutating winding, and means for connecting said armature winding, commutating winding, and secondary winding in series relation.

WILHELM WEILER.